CATHODE-RAY TUBE SYSTEM UTILIZING INDEXING SIGNALS

Filed Dec. 28, 1950 2 Sheets-Sheet 1

INVENTOR.
WILLIAM E. BRADLEY
BY
Allen V. Hazeltine
ATTORNEY

INVENTOR.
WILLIAM E. BRADLEY
BY
Allen V. Hazeltine
ATTORNEY

Patented July 7, 1953 2,644,855

UNITED STATES PATENT OFFICE 2,644,855

CATHODE-RAY TUBE SYSTEM UTILIZING INDEXING SIGNALS

William E. Bradley, Newtown, Pa., assignor to Philco Corporation, Philadelphia, Pa., a corporation of Pennsylvania Application December 28, 1950, Serial No. 203,175

12 Claims. (Cl. 178—5.4)

Figure 1:
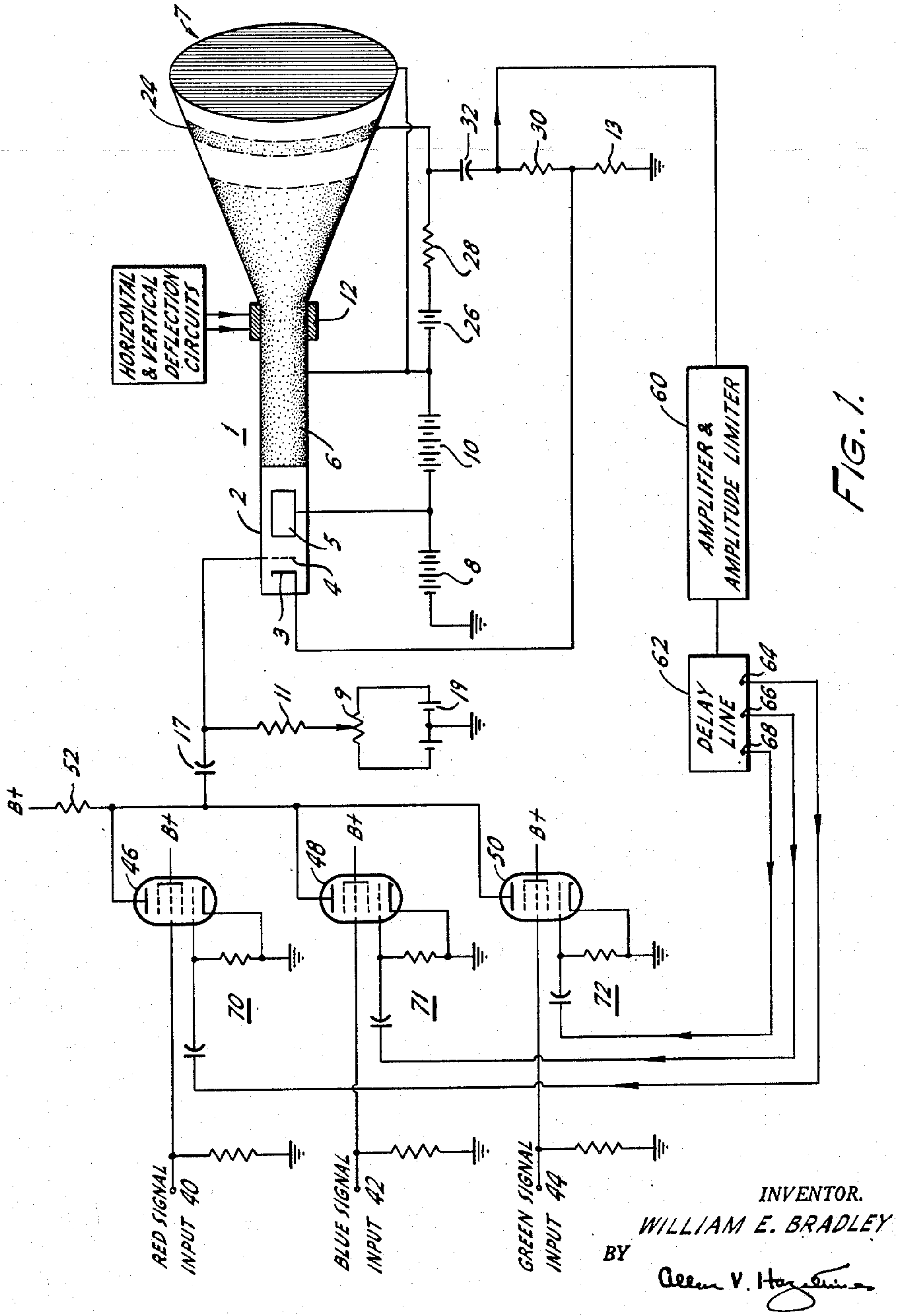

The present invention relates to cathode-ray tube systems and more particularly to cathode-ray tube systems in which the position of the electron beam relative to a beam intercepting member of the tube is controlled by an indexing member so arranged in cooperative relationship with the beam intercepting member to produce a signal whose time of occurrence is indicative of the time at which the cathode-ray beam attains a predetermined position.

There are a variety of circumstances in which it is desirable to produce and to utilize, signals whose times of occurrence are indicative of those times at which a cathode-ray beam attains predetermined positions. For example, in the copending application of David E. Sunstein, Ser. No. 185,106, filed September 15, 1950, and assigned to the same assignee as the present application, there is described a color television image-presentation system utilizing a single cathode-ray tube having a screen member comprising vertical stripes of luminescent materials which respond to electron impingement to produce light of three different primary colors. These stripes are preferably arranged in laterally-displaced color triplets, each triplet comprising three vertical phosphor stripes producing light of different primary colors. The order of arrangement of the stripes may be such that the normal horizontally-scanning cathode-ray beam produces red, blue, and green light successively. From a color television receiver there are then supplied three separate video signals, each indicative of a different primary color component of a televised scene, which signals are sampled sequentially and utilized to control the intensity of the cathode-ray beam. For proper color rendition, it is then required that, as phosphor stripes producing each of the primary colors of light are impinged by the cathode-ray beam, the intensity of the beam be simultaneously controlled in response to the contemporaneous value of the video signal representing the corresponding color component of the televised scene. However, since the rate at which the beam scans across the phosphor stripes of the screen may be variable, due, for example, to non-linearity of the beam deflecting signal, the times at which the samples of the several video color signals should be taken will generally not occur exactly periodically. To obtain proper timing of the sampling operations, it is therefore desirable to derive signals indicative of the instantaneous position of the cathode-ray beam upon the image-forming screen, and to utilize these indexing signals to control the times at which samplings of the several color signals are effected.

Although it will be convenient to describe the invention particularly with reference to a system which utilizes the signals indicative of the beam position for purposes of timing the sampling of color signals in a color television receiver, it will be obvious from the following that the invention is in no way dependent upon such use, and that the signals produced by the arrangement of the invention may be utilized for other purposes as well. For example, use may be made of the invention in effecting linearization of the deflection of a cathode-ray beam, in a system according to the disclosure of U. S. Patent No. 2,476,698, of R. G. Clapp, issued July 19, 1949.

In the copending application of Carlo V. Bocciarelli, Serial Number 198,709 filed December 1, 1950, and assigned to the same assignee as the present application, there is described and claimed a cathode-ray tube system in which the said indexing signal is derived from a plurality of stripe members arranged on the beam intercepting screen structure which members comprise a material having secondary-emissive properties which differ from the secondary-emissive properties of the remaining portions of the beam intercepting structure. The indexing stripe members are arranged each over a corresponding phosphor stripe serving to generate one of the primary colors so that when the beam impinges upon the phosphor stripe the indexing member is simultaneously excited and the resultant secondary emission produces a pulse in a suitable output electrode system.

In the case of a cathode-ray tube system for color television, the indexing member may consist of a high atomic number material such as gold, platinum or tungsten or may consist of certain mixtures including cesium or cesium oxide and the remainder of the beam intercepting structure may be provided with a coating of a material having a detectably different secondary-emissive ratio such as a coating of aluminum which coating also serves as a light reflecting mirror for the phosphor stripes in accordance with well known practice.

Because of the high accelerating voltages of the order of 10 to 20 kilovolts normally used in the systems under consideration, the difference in secondary emission between the indexing stripes and the aluminum coating is relatively small and in many instances there exists the danger that the normally detectable difference in voltage appearing at the collector electrode system may be masked or at least contaminated by spurious voltages. Such spurious voltages may derive for example, from the video signal itself which appears in the collector electrode system because of the fact that the collector electrode signal voltage is a function of the intensity of the cathode-ray beam and in the normal course of events the cathode-ray beam is intensity modulated by the video signal at the time that the beam impinges on the indexing stripe member.

It is an object of the invention to provide a cathode-ray tube system of the type in which the position of the electron beam relative to a beam intercepting member is controlled by an indexing member and in which a clearly defined indexing signal voltage is generated.

A further object of the invention is to provide a cathode-ray tube system in which the indexing signal voltage generated is substantially free of spurious signal voltages.

A further object of the invention is to provide a cathode-ray tube system which permits simple and inexpensive separation of the video and index signals whereby an index signal voltage substantially free of video components is attained.

Still another object of the invention is to provide a cathode-ray tube system of the type under consideration which permits the use of index signal voltage generating and control circuits of relatively narrow band width.

Further objects of the invention will appear as the specification progresses.

In accordance with the invention the foregoing objects are achieved by employing the cathode-ray tube having disposed therein a beam interceptive structure comprising beam-position indicating elements arranged in predetermined geometric relation to other portions of the beam interceptive structure. These beam position indicating elements are characterized by values of secondary-emission ratio which differ from those characterizing other regions of the beam interceptive structure, when electrons of the cathode-ray beam impinge thereon. Since the beam position indicating elements have predetermined values of secondary-emission ratio different from the secondary-emission ratio of the material of the remainder of the beam intercepting structure, a signal voltage is generated in the output collector electrode having variations corresponding to the respective secondary-emission ratios. However, since the voltage at the collector electrode is also a function of the intensity of the beam, and also because of random noise voltages generated by the beam, the signal voltage produced contains spurious signals constituted by video components and by such noise components. It has been found that it is possible to derive from another electrode of the cathode-ray tube system a second signal voltage consisting predominantly of video and noise components and that by suitable addition of the so derived second signal voltage and the collector voltage, an output signal voltage is obtained which is substantially free of spurious signals and in which the index voltage components are readily discernible. More particularly and in accordance with one embodiment of the invention, the spurious components are removed from the collector electrode system by feeding into the collector electrode system an appropriate amount of a voltage generated across, for example, an impedance in the cathode circuit by means of a resistor common to the cathode circuit of the tube and to the collector system.

The foregoing embodiment of the invention is based on the finding that the major difference between the wave form of the voltage derived from the collector electrode and the wave form of the voltage derived from the cathode circuit is in the polarity and magnitude of the index signal component of the respective voltages. The signal component at the collector electrode is larger than that appearing in the cathode circuit by the ratio of the secondary-emission ratio of the material of the index stripe to the secondary-emission ratio of the material of the remainder of the beam intercepting element i. e. the aluminum coating deposited on the phosphor stripes. Hence, by adding the two voltages in opposition it is possible to nullify the spurious signal components at the collector electrode to the first order without nullifying the major part of the index signal itself.

In accordance with another embodiment of the invention the voltage produced by the beam current as derived from an auxiliary electrode preferably constituted by the aluminum coating above referred to, is suitably combined with the voltage derived from the collector electrode, for example, by means of a tuned resonant circuit so as to produce cancellation of the spurious components. The net electron current arriving at such an auxiliary electrode consists of the incident electron beam current modulated with video from which is subtracted a secondary-emissive current determined in part by the secondary-emission ratio of the material upon which the beam impinges at the moment i. e. the secondary-emissive ratio of the material of the auxiliary electrode and/or the underlying phosphor stripe or of the material of the index stripe. Hence, the secondary-emissive current produced by impingement of the beam consists of two parts the first of which is a component varying in accordance with the video signal which combines with the video component produced by the incident beam and the second of which is a component made up of the index signal modulated with video and derived from the index stripe. Thus the net voltage derived from the auxiliary electrode contains as components the video signal and the index signal modulated with video.

The collector electrode on the other hand, receives only secondary-emissive current which also has two parts; namely, the video signal as determined in part by the secondary-emissive ratio of the auxiliary electrode, and the index signal modulated with video. By connecting the collector electrode and the auxiliary electrode to opposite ends of a tuned circuit having a tap off center in either the capacitance or inductance branch, the video signal may be cancelled leaving the index signal modulated with video. The video modulation may be subsequently removed by an amplitude limiting type amplifier thereby producing a clearly defined index signal.

Figure 4:
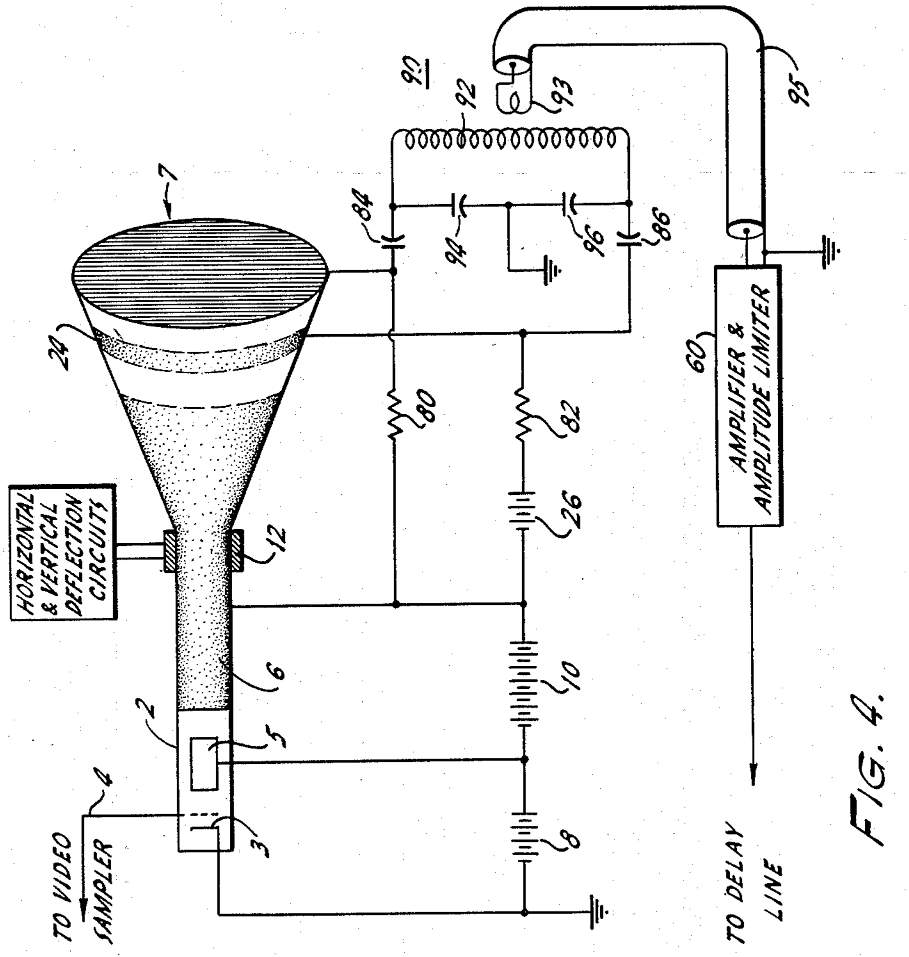
Figure 2:
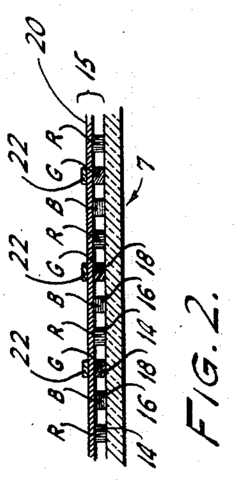
Figure 3:
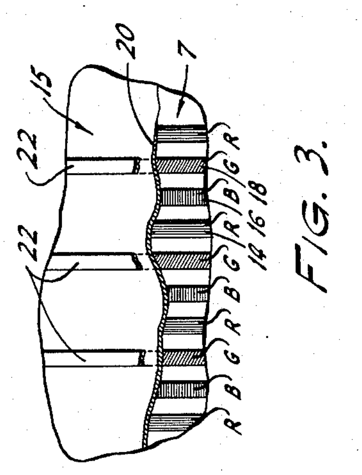

The invention will be described in greater detail with reference to the appended drawing forming part of the specification and in which:

Figure 1 is a diagram, partly schematic, showing one embodiment of a cathode-ray tube system in accordance with the invention, Figures 2 and 3 are respectively an enlarged cross-sectional view and a plan view of a portion of a beam-interceptive indexing screen member which may be used in the embodiment of the invention shown in Figure 1, and Figure 4 is a diagram partly schematic showing another embodiment of a cathode-ray tube system in accordance with the invention.

Referring to Figure 1, the embodiment of the invention shown therein comprises a cathode-ray tube 1 comprising, within an evacuated envelope 2, a conventional beam generating and accelerating electrode system comprising a cathode 3, a control electrode 4 for varying the intensity of the beam, a first anode or focusing electrode 5, and a beam accelerating electrode 6 which may consist of a conductive coating on the inner wall of the envelope and which terminates at a point spaced from the end face 7 of the tube in conformance with well-established practice. Suitable heating means (not shown) are provided for maintaining the cathode 3 at its operating temperature. The electrode system so defined is energized by a suitable source of potential shown as a battery 8 having its negative pole connected to ground and its positive pole connected to the anode 5 and by a battery 10 having its negative pole connected to the positive pole of the battery 8 and its positive pole connected to the accelerating electrode 6. In practice the battery 8 has a potential of 1 to 3 kilovolts whereas the battery 10 has a potential of the order of 10 to 20 kilovolts. The control grid 4 is connected through a resistor 11 and a potentiometer 9 to a battery 19 by means of which a steady state bias voltage is applied to the control grid.

A deflection yoke 12 coupled to horizontal and vertical deflection circuits of conventional design is provided for deflecting the generated electron beam across the face plate 7 of the cathode-ray tube to form a raster thereon.

The end face plate 7 of the tube is provided with a beam intercepting structure 15 shown in detail in Figures 2 and 3. In the arrangement shown in Figures 2 and 3 the structure 15 is formed directly on the face plate 7, however, it should be well understood that the structure 15 may be formed on a suitable light transparent base which is independent of the face plate 7 and may be spaced therefrom. In the arrangement shown, the end face 7 which in practice consists of glass having preferably substantially uniform transmission characteristics for the various colors in the visible spectrum, is provided with a plurality of elongated parallel arranged groups of stripes 14, 16, and 18, of phosphor material which, upon impingement of the cathode beam, fluoresce to produce light of three different primary colors. For example, the stripe 14 may consist of a phosphor which upon excitation produces red light, the stripe 16 may consist of a phosphor which produces blue light and the stripe 18 may consist of a phosphor which produces green light. Each of the groups of stripes may be termed a color triplet and, as will be noted, the sequence of the stripes is repeated in consecutive order over the area of the structure 15. Suitable materials constituting the phosphor stripes 14, 16 and 18 are well known to those skilled in the art as well as the method of applying the same to the face plate 7, and further details concerning the same are believed to be unnecessary.

The beam intercepting structure 15 further comprises a thin electron permeable conducting layer 20 which is arranged on the phosphor stripes 14, 16 and 18 and which preferably further constitutes a mirror for reflecting light generated at the phosphor stripes. In practice the layer 20 is a light reflecting aluminum coating which is formed in well known manner. It should be well understood that other metals capable of forming a coating in the manner similar to aluminum and having a secondary-emissive ratio detectably distinct from that of the material of indexing member may also be used. Such other metals may be, for example, magnesium or beryllium.

Arranged over one of the phosphor stripes of each of the color triplets (i. e. over each of the green phosphor stripes 18) is an indexing stripe 22 consisting of a material having a secondary-emissive ratio detectably different from that of the material of coating 20. The stripe 22, usually of gold, may consist of other high atomic number metals or of a mixture containing cesium oxide as previously pointed out.

The beam intercepting structure so constituted is connected to the positive pole of the battery 10 by means of a suitable lead attached to the aluminum coating 20.

Interposed between the end of the accelerating anode 6 and the beam intercepting structure 15 is an output collector electrode 24, consisting of a ring shaped coating for example, of graphite or of silver, on the wall of the envelope. Electrode 24 is energized through a load resistor 28 by a suitable source 26, shown as a battery. The source 26 may have a potential of the order of 3 kilovolts.

In the operation of the cathode-ray tube system so far described the cathode-ray beam in its vertical and horizontal travel across the beam intercepting structure 15 (see Figures 2 and 3) impinges successively on the coating 20 and the indexing stripes 22 producing through the load resistor 28 a composite secondary-emissive current having a spurious component and an index component. As previously noted, the spurious component comprises in part a current proportional to the video signal applied to the control grid 4 of the tube and noise, and the index component comprises a current pulse modulated by the video signal applied to the grid 4. Similarly, the cathode-ray beam current passing through the tube and through the cathode circuit thereof comprises video and noise components and an index signal component modulated by the video. To insure that an indexing signal is generated even in the absence of video signals to the control grid, the steady state bias of the grid 4 is adjusted, by means of the potentiometer 9, to a value producing a desired minimum beam current flow.

In accordance with the embodiment of the invention shown in Figure 1, the voltages derived from the cathode-ray beam current and from the secondary-emissive collector electrode are combined to produce an output voltage substantially free of spurious components and made up to the desired extent of indexing pulses containing video modulation. For this purpose there is provided a resistor 30 connected in series with the cathode resistor 13 and coupled to the load resistor 28 through a capacitor 32. The desired output index voltage appears at the junction of resistor 30 and capacitor 32 and the desired degree of cancellation of the spurious components, and hence the desired purity of the output voltage, is effected by appropriate proportioning of the resistors 13 and 30.

In a typical case load resistor 28 may have a value of 100,000 ohms and the resistors 13 and 30 may have values of 300 and 700 ohms respectively.

The indexing signals so produced are used for controlling the position of the cathode-ray beam throughout its movement across the beam intercepting structure 15 in the manner set forth in detail in the above noted copending application of David E. Sunstein.

More particularly, and for the reproduction of a color image on the face plate of the cathode-ray tube, there are provided color signal input terminals 40, 42 and 44 which are supplied from a television receiver with separate signals indicative of the red, blue and green components of the televised scene, respectively, which signals preferably have had their D.-C. components restored, and are of such polarity that the more positive portions thereof correspond to darker regions of the television image. The system then operates to sample these three color signals in sequence so that the red video signal controls the cathode-ray beam intensity upon impingement of the red stripe 14 of the beam intercepting structure 15, the blue video signal is controlling upon impingement of the blue stripe 16, and the green video signal controls the beam intensity when the green stripe 18 is impinged. Accordingly, the three video input signals are supplied to intensity-controlling electrode 4 through sampling tubes 46, 48 and 50 respectively. Sampling tube 46 may comprise a pentagrid vacuum tube which has its cathode grounded, its second and fourth grids connected to a suitable source of positive screen potential, its third grid supplied with the red video signal to be sampled, its first grid supplied with a sampling signal for rendering tube 46 conductive only during predetermined portions of the sampling signal, and its plate connected to a source of positive potential designated B+ through a plate load resistor 52 and to the control grid 4 through a coupling capacitor 17. Sampling tubes 48 and 50 may be substantially identical with sampling tube 46, being supplied at their respective third grids with the blue and green video signals, respectively, and having their respective plates connected to the source of potential B+ through the common plate load resistor 52. By supplying each of the color-signal sampling tubes, at the first grids thereof, with sampling signals whose positive peak values coincide in time with impingement of the corresponding color stripes arranged on the screen member 7, the applications of the color samples to intensity-controlling electrode 4 are caused to occur at the proper times.

The voltage appearing at the junction of resistor 30 and capacitor 32, as previously noted is substantially free of spurious components and is largely made up of the desired index signals modulated by the video signal applied to grid 4. This voltage is applied to an amplifier 60 containing an amplitude limiter of conventional design by means of which the video modulation is removed from the indexing signals. Amplifier 60 is characterized by sufficient gain to amplify the indexing signals supplied thereto to a conveniently usable level, and may be adapted to do so without distortion of the indexing pulse waveform, although this is not essential so long as the phase characteristics of the amplifier are such that the positive peaks of the amplified output signals therefrom occur in pre-determined time relationship to the times of occurrence of peaks produced in the signal at collector electrode 24 in response to impingement of indexing stripes.

The output signals from amplifier 60 are supplied to the input of a delay line 62, which is provided with three taps 64, 66 and 68. Delay line 62, may comprise a series of filter sections designed in accordance with principles well known in the art so as to provide a total delay, for signals passing therethrough, which is at least as great as the average time required for the cathode-ray beam to scan from the center of one indexing stripe 22 to the center of the next subsequently-impinged indexing stripe 22, and is preferably terminated in its characteristic impedance so as to minimize reflections from the termination thereof.

Tap 64 is spaced from the input of delay line 62 by an amount sufficient to provide a signal delay therebetween substantially equal to the average time required for the cathode-ray beam to sweep from the center of an indexing stripe to the center of the adjacent red phosphor stripe 14, tap 66 is spaced from tap 64 by an amount sufficient to provide a value of signal delay therebetween substantially equal to the average time required for the cathode-ray beam to travel from the center of a red phosphor stripe to the center of the next adjacent blue phosphor stripe 16, while tap 68 is spaced from tap 66 by an amount sufficient to provide a signal delay substantially equal to the average time required for the cathode-ray beam to sweep from the center of a blue phosphor stripe to the center of the next adjacent green phosphor stripe 18 and the superimposed indexing stripe 22.

The signal at tap 64 constitutes a red-signal sampling signal which is supplied through a resistance-capacitance circuit 70 to the first grid of red signal sampler tube 46 so as to produce actuation thereof and thereby effect application of a sample of the red video input signal to the intensity-controlling electrode 4 of cathode-ray tube 1. The time constant of resistance-capacitance network 70 is sufficiently long, compared to the period of the sampling signal from tap 64, so that leveling upon the peaks of the sampling signals supplied thereto from tap 64 is effected, and actuation of sampling tube 46 is caused to occur only during a predetermined relatively brief interval surrounding the time at which the sampling signal attains its peak values. Similarly, the signal at delay line tap 66 is supplied through resistance-capacitance network 71 to the first grid of sampler tube 48 so as to effect sampling of the blue video signal when the sampling signal at tap 66 attains its maximum values. Finally, the signal at tap 68 is supplied through resistance-capacitance network 72 to the first control grid of green sampler tube 50, so as to effect actuation thereof contemporaneously with the attainment of peak values by the sampling signal at tap 68.

Whereas in the arrangement shown in Figure 1 the compensating voltage for cancelling the video and noise components from the output indexing voltage is derived from the cathode-ray beam current by means of the cathode-resistor 13, in the arrangement shown in Figure 4, the compensating voltage is derived from the beam current by means of an auxiliary electrode which in practice is constituted by the coating 20 (see Figures 2 and 3). For this purpose the electrode 20 is coupled to the high tension source for the beam through a load impedance 80 to generate a voltage made up of video signals having an amplitude proportional to the intensity of the beam and the secondary-emission ratio of the metal of the electrode 20, noise signals, and an index signal which carries video modulation and has amplitude variations proportional to the difference between the secondary-emission ratios of the material of electrode 20 and the material of the indexing stripe 22. The collector electrode 24, as in the case of the embodiment shown in Figure 1, is coupled to its potential source by means of its load impedance 82 to generate a voltage made up of video signals having an amplitude proportional to the intensity of the beam and proportional to the secondary-emission ratio of the material of the collector electrode 20, noise signals, and an index signal which carries video modulation and has amplitude variations proportional to the difference between the secondary-emission ratios of the material of electrode 20 and the material of the indexing stripe 22.

Since auxiliary electrode 20 is in the direct path of the cathode-ray beam and has a small secondary-emissive ratio relative to the secondary-emission ratio of the stripe 22, the voltage generated across load impedance 80 will be predominantly constituted by video signal components and the indexing signal component will be relatively small. On the other hand because of the relatively larger secondary-emissive ratio of the indexing stripe 22 the voltage generated across load impedance 82 is predominantly made up of indexing signal components and the video signal components are relatively smaller.

Load impedance 80 and 82 are coupled through capacitors 84 and 86 respectively, to the opposite ends of a tuned circuit 90 to effect cancellation of the video and noise components of the applied signal voltages leaving the desired indexing signal. Tuned circuit 90 comprises an inductive branch 92 and a capacitive branch comprising capacitors 94 and 96 connected in series and the interconnection of which is suitably grounded. By adjusting the relative values of capacitors 94 and 96 the desired degree of cancellation of the spurious signals may be obtained. It is evident that a similar cancelling effect may be produced by providing the ground return to an appropriate tapping of the inductor 92. Impedances 80 and 82 may be adjustable relative to each other in order to improve the phase balance.

The impedances 80 and 82 preferably consist of resistors and may each have a value of 100,000 ohms and blocking capacitors 84 and 86 may have a value of 500 micromicrofarads. For an indexing frequency of 2 megacycles, as determined by the number of indexing stripes 22 arranged in the path of the beam and the velocity of scanning, capacitors 94 and 96 may have values of 100 micromicrofarads and 900 micromicrofarads respectively and the inductor 92 may have a value of approximately 65 microhenries.

An advantage of the arrangement shown in Figure 2 is that the tuned circuit 90 imparts to the indexing signal a substantially sinusoidal wave form so that a signal of readily determinable phase position is produced.

The indexing signal appearing in the inductance 92 is picked up by a suitable loop 93 and by means of the shielded cable 95 is applied to an amplitude limiting type amplifier 60 from which the signal is applied to a delay line and in turn the video sampler tubes in the same manner as in the embodiment of the invention described in Figure 1. Similarly, the cathode-ray tube of the embodiment shown in Figure 4 and its energizing components conform to those described in connection with the embodiment shown in Figure 1. More particularly, the tube shown as 1 comprises an envelope 2 with beam forming and intensity control electrodes comprising a cathode 3, a control grid 4, a focusing electrode 5 and an accelerating electrode 6, a collector electrode 24 and a beam intercepting structure 15 as shown in Figures 2 and 3 which is formed on the face plate 7. The cathode 3 is maintained at ground potential whereas electrodes 5, 6 and 24 are maintained at their operating potentials by means of the voltage sources 8, 10 and 26 respectively, connected in series relationship. A deflection coil assembly 12 energized by suitable horizontal and vertical deflection circuits scans the cathode-ray beam across the surface of the beam intercepting structure arranged on the face of plate 7. The control grid 4 is coupled to a suitable biasing system and to the video sampler tubes as in the arrangement shown in Figure 1.

From the foregoing it will be seen that the invention provides simple and highly effective means by which a clearly defined indexing signal may be readily obtained notwithstanding the fact that the generated signal is initially contaminated by spurious voltages. Furthermore, the specific arrangement shown in Figure 2 provides a system which produces an indexing signal having a readily determinable phase position so that control circuits of relatively narrow band width may be used.

While the invention has been described with reference to a specific cathode-ray tube system and in specific embodiments, I do not wish to be limited thereto as obvious modifications will readily occur to those skilled in the art without departing from the spirit and scope of the invention.

I claim:

1. A cathode-ray tube system comprising, a cathode-ray tube having a cathode source of an electron beam, a control electrode for varying the intensity of said beam, a beam intercepting structure having first portions thereof spaced apart and comprising a material having a first given response characteristic upon electron impingement, said structure further comprising second portions arranged intermediate said spaced portions and comprising a material having a second given response characteristic upon electron impingement different from said first given response characteristic, means to periodically deflect said beam across said beam intercepting structure to thereby impinge said beam successively on said first and second portions, means to apply an input signal to said control electrode to thereby vary the intensity of said beam proportionally to variations of said input signal, means to produce a first signal proportional to intensity variations of said beam and to the variations of said response characteristics as said beam traverses said first and second portions, means to produce a second signal proportional to the intensity variations of said beam, and means to combine said first and second signals to produce an output signal having variations proportional to the variations of said response characteristics as said beam traverses said portions and substantially free of variations proportional to said intensity variations of said beam.

2. A cathode-ray tube system comprising, a cathode-ray tube having a plurality of electrodes including a cathode source of an electron beam and a control electrode for varying the intensity of said beam, a beam intercepting structure having first portions thereof spaced apart and comprising a material having a first given response characteristic upon electron impingement, said structure further comprising second portions arranged intermediate said spaced portions and comprising a material having a second given response characteristic upon electron impingement different from said first given response characteristic, means to periodically deflect said beam across said beam intercepting structure to thereby impinge said beam successively on said first and second portions, means to apply an input signal to said control electrode to thereby vary the intensity of said beam proportionally to variations of said signal, means to derive from one of said electrodes a first signal proportional to intensity variations of said beam and to the variations of said response characteristics as said beam traverses said first and second portions, means to derive from another of said electrodes a second signal proportional to the intensity variations of said beam and to the variations of the said response characteristics as said beam traverses said first and second portions, and means to combine said first and second signals to produce an output signal having variations proportional to the variations of said response characteristics as said beam traverses said portions and substantially free of variations proportional to said intensity variations of said beam.

3. A cathode-ray tube system as claimed in claim 2 wherein said first portions comprise a material having a secondary electron emissivity different from the secondary electron emissivity of said second portions.

4. A cathode-ray tube system as claimed in claim 3 wherein said beams to produce a first signal proportional to intensity variations of said beam and to the variations of secondary electron emissivity of said portions as said beam traverses said first and second portions comprises an electrode arranged in cooperative relationship to the said beam intercepting structure and impedance means coupled to said electrode, and wherein said means to produce a second signal proportional to intensity variations of said beam comprise impedance means coupled to said cathode source.

5. A cathode-ray tube system as claimed in claim 3 wherein said beam intercepting structure constitutes one of said electrodes and wherein said means to produce one of said signals comprise impedance means coupled to said one electrode, and wherein said means to produce the other of said signals comprise a secondary electron collector electrode arranged in cooperative relationship to said beam intercepting structure and impedance means coupled to said collector electrode.

6. A cathode-ray tube system as claimed in claim 3 wherein said first portions are in the form of stripes arranged transverse to the direction of deflection of said beam.

7. A cathode-ray tube system as claimed in claim 5 wherein said impedance means constitute a resonance circuit coupled between said one electrode and said collector electrode.

8. A cathode-ray tube system for color television comprising, a cathode-ray tube having a cathode source of an electron beam, a control electrode for varying the intensity of said beam, a beam intercepting structure, said beam intercepting structure comprising a plurality of similar laterally-displaced groups of stripe regions arranged in a first given geometric configuration, each stripe region of each of said groups producing light of a different color in response to electron impingement, said structure further comprising a plurality of laterally-displaced spaced portions arranged in a geometric configuration indicative of said first geometric configuration and comprising a material having a secondary electron emissivity different from the secondary electron emissivity of the portions of said structure arranged therebetween, means to periodically deflect said beam across said structure thereby to impinge said beam successively on said spaced stripe members and said intervening portions, means to apply an image signal voltage to said control electrode thereby to vary the intensity of said beam proportionally to variations of said signal voltage, means coupled to said beam intercepting structure to produce a first signal proportional to variations in secondary electron emission from said structure as said beam traverses said structure, means to produce a second signal proportional to the intensity variations of said beam, and means to combine said first and second signals to produce an output signal having variations proportional to variations of secondary emission from said structure as said beam traverses said structure and substantially free from varations proportional to said intensity variations of said beam.

9. A cathode-ray tube system as claimed in claim 8 wherein said means to produce said first signal comprise an impedance element coupled to said beam intercepting structure for producing a voltage proportional to current flow through said structure, wherein said means to produce said second signal comprise an impedance coupled to said cathode source for producing a voltage proportional to beam current flow through said cathode source, and wherein said impedance elements are coupled in series relationship to produce said output signal.

10. A cathode-ray tube system as claimed in claim 8 wherein said beam intercepting structure constitutes an electrode and is adapted to produce one of said signals, wherein a secondary electron collector electrode is arranged in cooperative relationship to said structure and is adapted to produce the other of said signals, and further comprising a resonance circuit having its ends coupled to said electrodes for combining said signals to thereby produce said output signal.

11. A cathode-ray tube system for color television comprising, a cathode-ray tube having a cathode source of an electron beam, a control grid for varying the intensity of said beam, a beam intercepting structure and a secondary electron collector electrode arranged in cooperative relationship to said beam intercepting structure, said beam intercepting structure comprising a plurality of similar laterally displaced groups of stripe regions, each stripe region of each of said groups producing different colors of light in response to electron impingement, an electron permeable electrically conducting layer arranged on said groups of stripe regions and comprising a material of a first given secondary emissivity and a plurality of laterally displaced stripe regions of a material of a second given secondary emissivity arranged on said electron permeable layer, means to periodically deflect said beam across said beam intercepting structure to thereby impinge said beam successively on said layer and on said secondary emissive stripe regions, means to apply an image signal voltage to said control grid, a resistance element coupled to said cathode source to derive from said beam a first voltage having variations proportional to said image signal voltage and proportional to variations in secondary electron emission from said layer and said secondary emissive stripe regions as said beam traverses said layer and said secondary emissive stripe regions, a second resistance element coupled to said collector electrode for producing a second voltage having variations proportional to said image signal voltage and proportional to variations in secondary electron emission from the said layer and said secondary emissive stripe regions, said resistance elements being connected in series to produce an output voltage having variations proportional to the difference in secondary electron emission of said layer and said secondary emissive stripe regions and substantially free of variations proportional to said image signal voltage.

12. A cathode-ray tube system for color television comprising, a cathode-ray tube having a cathode source of an electron beam, a control grid for varying the intensity of said beam, a beam intercepting structure and a secondary electron collector electrode arranged in cooperative relationship to said beam intercepting structure, said beam intercepting structure comprising a plurality of similar laterally displaced groups of stripe regions, each stripe region of each of said groups producing different colors of light in response to electron impingement, an electron permeable aluminum layer arranged on said groups of stripe regions and constituting an auxiliary electrode of said cathode ray tube and a plurality of laterally displaced stripe regions of a material having a secondary electron emissivity different from that of aluminum arranged on said aluminum layer, means to periodically deflect said beam across said beam intercepting structure to thereby impinge said beam successively on said layer and on said secondary emissive stripe regions, means to apply an image signal voltage to said control grid, and a resonant circuit comprising capacitive and inductive branches connected in parallel relationship, having one end thereof coupled to said auxiliary circuit and the other end thereof coupled to said collector electrode, one of said branches being provided with a grounded tapping so positioned as to produce a voltage at said resonant circuit having variations proportional to the difference in secondary electron emission of said layer and said secondary emissive stripe regions and substantially free of variations proportional to said image signal voltages.

WILLIAM E. BRADLEY.

References Cited in the file of this patent

UNITED STATES PATENTS

| Number | Name | Date |
|---|---|---|
| 2,476,698 | Clapp | July 19, 1949 |
| 2,490,812 | Huffman | Dec. 13, 1949 |
| 2,530,431 | Huffman | Nov. 21, 1950 |
| 2,545,325 | Weimer | Mar. 13, 1951 |